(12) United States Patent
Lee

(10) Patent No.: US 11,695,355 B2
(45) Date of Patent: Jul. 4, 2023

(54) MOTOR SYSTEM AND MOTOR DRIVING METHOD

(71) Applicant: Sentelic Corporation, Taipei (TW)

(72) Inventor: Wen-Ting Lee, Taipei (TW)

(73) Assignee: Sentelic Corporation, Taipei (TW)

( * ) Notice: Subject to any disclaimer, the term of this patent is extended or adjusted under 35 U.S.C. 154(b) by 107 days.

(21) Appl. No.: 17/316,687

(22) Filed: May 10, 2021

(65) Prior Publication Data

US 2022/0255477 A1  Aug. 11, 2022

(30) Foreign Application Priority Data

Feb. 5, 2021 (TW) ................................. 110104416

(51) Int. Cl.
*H02P 6/00* (2016.01)
*H02P 6/16* (2016.01)
*H02P 6/182* (2016.01)
*H02P 21/18* (2016.01)

(52) U.S. Cl.
CPC .............. *H02P 6/182* (2013.01); *H02P 21/18* (2016.02)

(58) Field of Classification Search
CPC ................................ H02P 21/18; H02P 6/182
USPC ...................................................... 318/400.35
See application file for complete search history.

(56) References Cited

U.S. PATENT DOCUMENTS

| 8,093,847 B2 * | 1/2012 | Otaguro | G11B 19/28 |
| | | | 318/400.34 |
| 2006/0132075 A1 | 6/2006 | Lee et al. | |
| 2009/0167220 A1 * | 7/2009 | Kanamori | H02P 6/20 |
| | | | 318/400.11 |
| 2010/0019710 A1 * | 1/2010 | Schwarzkopf | H02P 6/18 |
| | | | 318/400.35 |
| 2010/0177626 A1 * | 7/2010 | Otaguro | H02P 6/18 |
| | | | 318/400.35 |
| 2013/0113400 A1 * | 5/2013 | Kishimoto | H02P 6/16 |
| | | | 318/400.14 |
| 2014/0232311 A1 * | 8/2014 | Hill | H02P 6/185 |
| | | | 318/400.33 |
| 2015/0069943 A1 | 3/2015 | Ko | |

(Continued)

FOREIGN PATENT DOCUMENTS

| CN | 103797705 B | 4/2017 |
| CN | 107834917 A | 3/2018 |
| TW | 201123706 A | 7/2011 |

(Continued)

*Primary Examiner* — Erick D Glass
(74) *Attorney, Agent, or Firm* — CKC & Partners Co., LLC

(57) ABSTRACT

The present disclosure relates to a motor driving method, which includes the following steps: detecting a detected voltage value between a first switch and a second switch in a driving circuit, wherein the driving circuit is configured to control the first switch and the second switch according to a switching frequency to provide a driving current to a motor device; determining a driving current according to the detected voltage value; when the driving current is less than a predetermined value, the first switch and the second switch are turned off for a detection period, wherein the length of the detection period is a fixed value; during the detection period, detecting a back electromotive force to calculate a zero crossing time of the back electromotive force; and adjusting the switching frequency according to the zero crossing time.

14 Claims, 4 Drawing Sheets

(56) References Cited

U.S. PATENT DOCUMENTS

2015/0145455 A1* 5/2015 Heynlein ............... H02P 6/18
318/400.35

FOREIGN PATENT DOCUMENTS

| TW | 201125277 A | 7/2011 |
|----|-------------|--------|
| TW | 201233046 A | 8/2012 |
| TW | I415380 B | 11/2013 |
| TW | I469504 B | 1/2015 |

* cited by examiner

MOTOR SYSTEM AND MOTOR DRIVING METHOD

CROSS-REFERENCE TO RELATED APPLICATION

This application claims priority to Taiwan Application Serial Number 110104416, filed Feb. 5, 2021, which is herein incorporated by reference in its entirety.

BACKGROUND

Technical Field

The present disclosure relates to a motor system and a motor driving method, especially a technology that calculates the position of the rotor by determining the back electromotive force.

Description of Related Art

With the development of technology, the operating frequency of various electronic devices has increased, but the increase in operating frequency increases the internal temperature of the electronic device during operation. In order to prevent high temperature from affecting the operation of electronic devices and even damage to electronic devices, "fans" have become an indispensable accessory for electronic devices to maintain operation.

When the fan system operating, it is necessary to determine the operation status according to the position of the rotor of the motor. Although a position sensor can be configured in the fan system to detect the rotor of the motor, this method requires higher cost and larger installation space. Therefore, a driving method suitable for the sensorless fan system is needed.

SUMMARY

One aspect of the present disclosure is a motor driving method, comprising: detecting a detected voltage value between a first switch and a second switch in a driving circuit, wherein the driving circuit is electrically connected to a power supply and a motor device, and is configured to control the first switch and the second switch according to a switching frequency to provide a driving current to the motor device; determining the driving current according to the detected voltage value; turning off the first switch and the second switch for a detection period when the driving current is less than a predetermined value, wherein a length of the detection period is fixed; during the detection period, detecting a back electromotive force of the motor device to calculate a zero crossing time of the back electromotive force; and adjusting the switching frequency according to the zero crossing time.

Another aspect of the present disclosure is a motor system, comprising a driving circuit, a motor device and a control circuit. The driving circuit is electrically connected to a power supply, and at least comprises a first switch and a second switch. The driving circuit is configured to generate a driving current. The motor device is electrically connected to the driving circuit, and is configured to receive the driving current. The control circuit is electrically connected to the driving circuit, and is configured to detect a detected voltage value between the first switch and the second switch. The control circuit is configured to turn off the first switch and the second switch for a detection period when the control circuit determines that the driving current is less than a predetermined value. The control circuit is configured to detect a back electromotive force of the motor device to calculate a zero crossing time of the back electromotive force.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
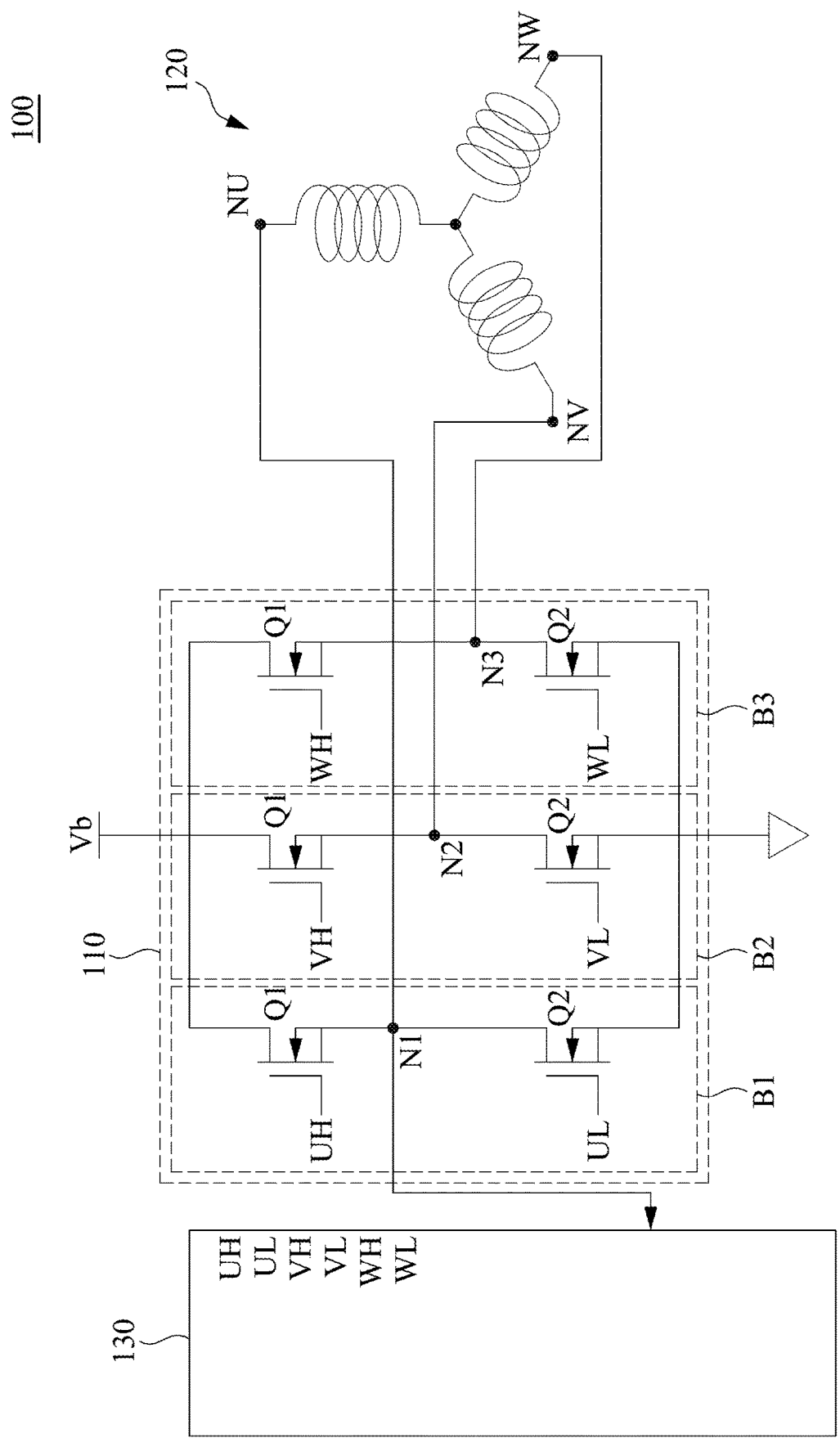
FIG. 1 is a schematic diagram of a motor system in some embodiments of the present disclosure.

FIG. 1 is a schematic diagram of a motor system 100 in some embodiments of the present disclosure. The motor system 100 includes a driving circuit 110, a motor device 120 and a control circuit 130. The driving circuit 110 is electrically connected to a power supply Vb and a motor device 120, and includes multiple switching elements. In one embodiment, the driving circuit 110 controls the turn on and the turn off of the switching elements according to the control signals UH, UL, WH, WL, VH, VL to output a driving current.

The motor device 120 is electrically connected to an output terminal of the driving circuit 110 to receive the driving current. In one embodiment, the motor device 120 is configured to drive the fan blade (not shown in the figure) to rotate. In some embodiments, the motor device 120 is a three-phase motor, and includes three input terminals NU, NV, NW. In some embodiments, the motor system 100 is applied to a fan system. In other words, the motor device 120 is configured to drive the fan blade to rotate, but the present disclosure is not limited to this, and the present disclosure can also be applied to other types of devices.

The driving circuit 110 includes three bridge arm circuits B1-B3. Each of three bridge arm circuits B1-B3 includes a first switch Q1 and a second switch Q2, and is electrically connected to the different input terminals NU, NV, NW. The first switch Q1 and the second switch Q2 in each of the bridge arm circuits B1-B3 is turned on or turned off according to the control signals UH, UL, WH, WL, VH, VL, so as to provide the three-phase driving current to the motor device 120. Since one skilled in art understands the operation of the three-phase motor, it is not repeated here.

The control circuit 130 is electrically connected to any one of the bridge arm circuits B1-B3 in the driving circuit 110, is configured to provide the control signals UH, UL, WH, WL, VH, VL, and is further configured to detect a detected voltage value of a detection terminal between the first switch Q1 and the second switch Q2. As shown in FIG. 1, the control circuit 130 is connected to any one of the detection terminals N1, N2, N3. In one embodiment, the control circuit 130 generates the control signals UH, UL, WH, WL, VH, VL according to the rotating speed signal. The rotating speed signal is a pulse width modulation signal, and the frequency of the rotating speed signal corresponds to the control signals UH, UL, WH, WL, VH, VL. The rotating speed signal is configured to control a switching frequency of the first switch Q1 and the second switch Q2.

The control circuit 130 may determine the current information of the driving current according to the detected voltage value, such as strength of current, direction of current, etc. When the control circuit 130 determines that the driving current is less than the predetermined value, the control circuit 130 confirms that the first switch Q1 and the second switch Q2, which are connect to the control circuit 130, are maintained in the turn off state, and the maintenance time is the fixed value. For explanation, the maintenance time is referred to as "the detection period" here. In the detection period, the control circuit 130 detects the strength and trend of a back electromotive force (back EMF) of the motor device 120, and then calculates the time for the back electromotive force to return to zero (hereinafter "zero crossing time").

In one embodiment, the above "predetermined value" is a value close to zero. In other words, the control circuit 130 detects the back electromotive force when the driving current passes through a zero point. The control circuit 130 starts timing "the detection period" when the driving current closes to zero. In some other embodiments, when the control circuit 130 determines that the driving current is zero, the control circuit 130 starts timing "the detection period" (i.e., the time point when the driving current is zero is the starting point of the detection period).

Specifically, during the detection period, the control circuit 130 detects the back electromotive force of the motor device 120 at different time points to obtain multiple the detection electromotive forces. The control circuit 130 can calculate the changing trend of the back electromotive force according to the detection electromotive force, so as to estimate the zero crossing time of the back electromotive force.

In some other embodiments, the control circuit 130 stores a parameter model of the motor device 120, so that the control circuit 130 detects the back electromotive force only once during the detection period to calculate the zero crossing time of the back electromotive force. In addition, the control circuit 130 can adjust the rotating speed or drive the driving voltage of the motor device 120 by the detected back electromotive force, instead of the parametric model, to calculate the zero crossing time of the back electromotive force.

Figure 2A:
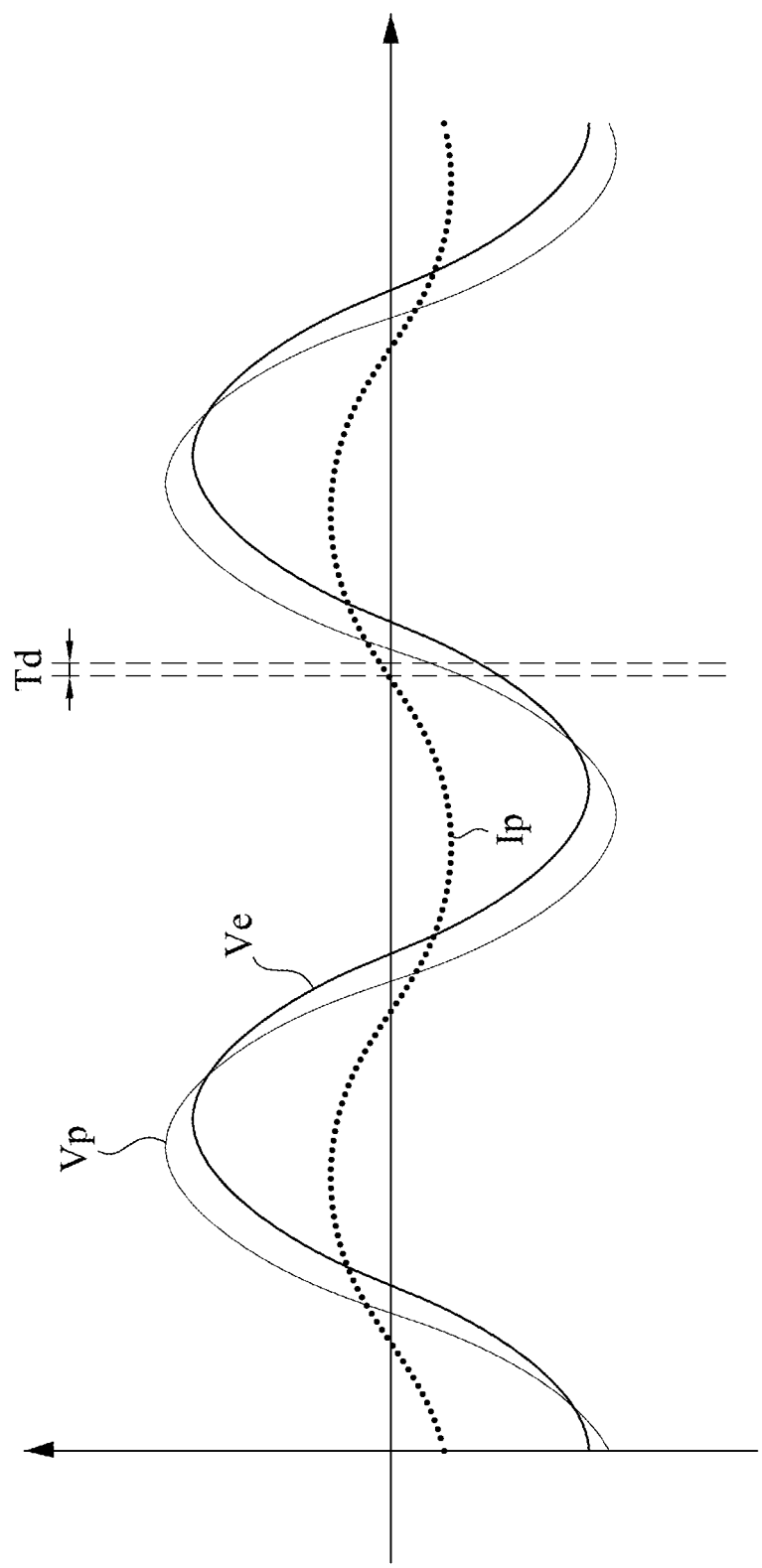
FIG. 2A is a waveform diagram of signals in some embodiments of the present disclosure.

FIG. 2A is a waveform diagram of signals in some embodiments of the present disclosure, wherein signals includes the driving voltage Vp of the motor device, the driving current Ip and the back electromotive force Ve. The horizontal axis of FIG. 2A represents time, and the vertical axis represents the changing trend of current, voltage, and electromotive force. As shown in the figure, when the driving current Ip passes through the zero point (i.e., during the detection period Td), the control circuit 130 detects the back electromotive force Ve of the motor device 120 to obtain at least two detection electromotive forces. The detection electromotive force is used to form a characteristic line. The time when the characteristic line meets the zero point can be calculated according to the slope of the characteristic line, or according to the coordinates of the detection electromotive force A and B with the trigonometric function.

Figure 2B:
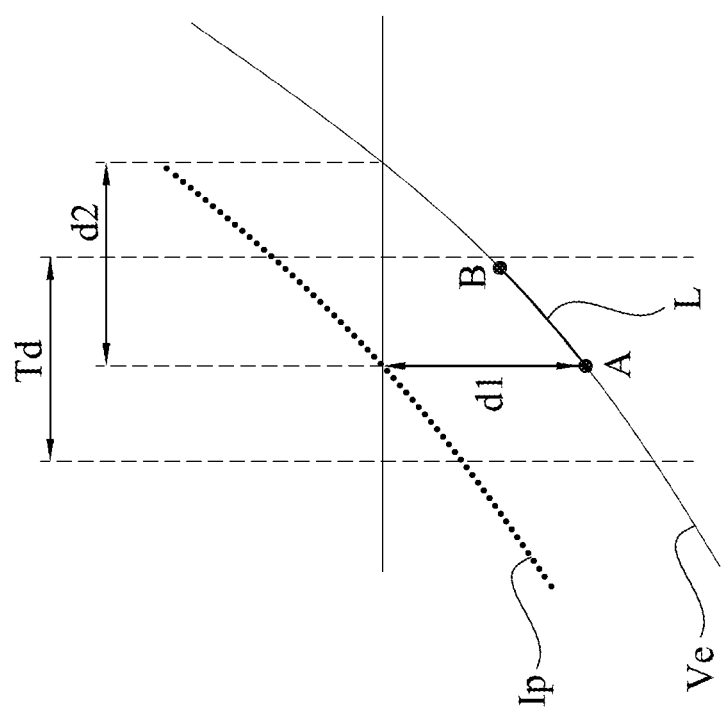
FIG. 2B is a partial waveform of signals in some embodiments of the present disclosure.

FIG. 2B is a partial waveform of FIG. 2A. as shown in figure, the control circuit 130 detects the back electromotive force Ve of the motor device 120 to obtain two detection electromotive force A, B. The curve of the driving current Ip is close to the curve of the back electromotive force Ve, so when the driving current Ip closes to zero (i.e., the detection period Td), the back electromotive force Ve will be close to the zero point. Accordingly, the characteristic line L formed by the connection of the detection electromotive force A and B can be regarded as a curve equivalent to the back electromotive force Ve. The control circuit 130 obtains a first distance d1 according to the detection electromotive force A and a value of the driving current Ip at the same time (In FIG. 2B, the driving current Ip corresponding to the detection electromotive force A is zero, so the first distance d1 is the coordinate value of the detection electromotive force A). Then, based on the slope of the first distance d1 and the characteristic line, the second distance d2 can be calculated. The second distance d2 is a time difference value between "the time point when the back electromotive force Ve returns to zero" and "the time point when the detection electromotive force A is detected".

The control circuit 130 is configured to calculate the rotor position of the motor device 120 according to the zero crossing time of the back electromotive force Ve and the rotating speed signal. The control circuit 130 can confirm whether the motor system 100 is operating normally. Since those in the art can understand the method of calculating the rotor position according to the back electromotive force, it will not be repeated here.

Specifically, in order to make the motor device 120 operate at an ideal efficiency and avoid excess energy consumption, the phases of the driving voltage Vp and the driving current Ip should correspond to each other (i.e., phases of the signal waveforms are the same). Therefore, in one embodiment, after the control circuit 130 calculates the zero crossing time of the back electromotive force and the rotor position, the control circuit 130 adjusts the frequency of the rotating speed signal accordingly (i.e., changes the switching frequency of the control signals UH, UL, WH, WL, VH, VL), so as to change the voltage phase of the driving voltage Vp and the current phase of the driving current Ip, and the phases of the two can be close to each other.

In some embodiments, when the control circuit 130 detects the detected voltage value between the first switch Q1 and the second switch Q2, the control circuit 130 maintain the first switch Q1 and the second switch Q2 in the turn off state to avoid the bridge arm circuits B1-B3 from being abnormal due to a short circuit. In other words, the time for the control circuit 130 to detect the detected voltage value is at the moment when both the first switch Q1 and the second switch Q2 are turned off.

The present disclosure uses a period of time when the driving current passes through zero point (or close to zero) to detect the back electromotive force for a fixed period of time (i.e., the detection period). According to multiple detection electromotive force of the back electromotive force during the detection period, the zero crossing time can be calculated. Accordingly, it can avoid the problem of excessive detection time, which causes the instability or abnormality of the motor system 100.

In some embodiments, the control signals UH, UL, WH, WL, VH, VL are generated according to the rotating speed signal, and is a kind of the pulse width modulation signal. The time length of the detection period is an integer multiple of a period of the pulse width modulation signal, and the integer multiple is a fixed value. For example, the time length of the detection period can be 2-5 periods of the pulse width modulation signal. In one embodiment, the time length of the detection period can be 3 periods of the pulse width modulation signal. The time length of the detection period is a fixed value, but it is not limited to the above 2-5 periods. It can be adjusted according to requirements in implementation.

Figure 3:
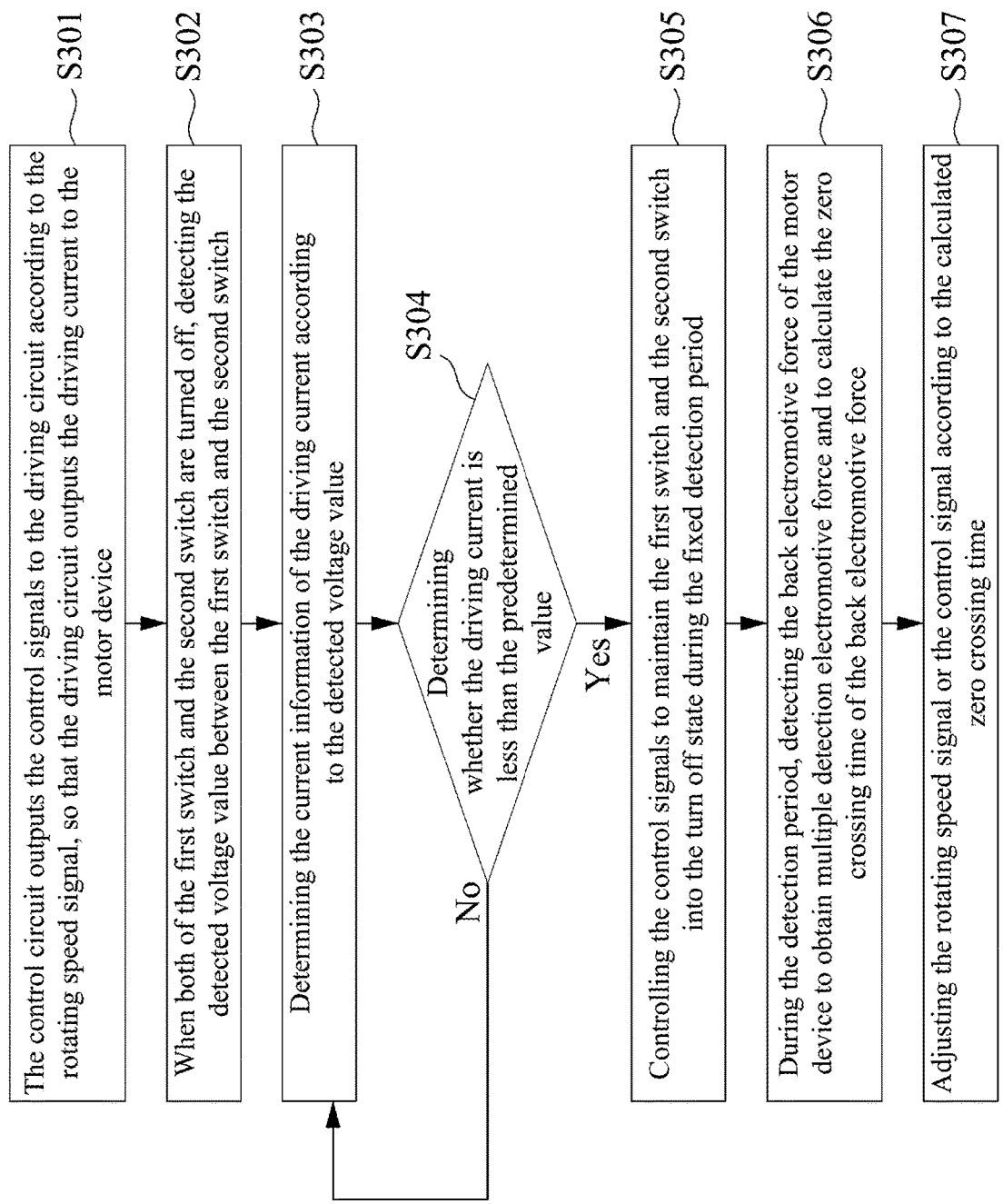
FIG. 3 is a flowchart illustrating a motor driving method in some embodiments of the present disclosure.

FIG. 3 is a flowchart illustrating a motor driving method in some embodiments of the present disclosure. In step S301, the control circuit 130 outputs the control signals UH, UL, WH, WL, VH, VL to the driving circuit 110 according to the rotating speed signal, so that the driving circuit 110 outputs the driving current to the motor device 120. The motor device 120 operates according to the driving current, and drive the fan blade.

In step S302, when the motor device 120 operating, the control circuit 130 detects the state of one of the first switch Q1 and the second switch Q in the bridge arm circuits B1-B3. When both of the first switch Q1 and the second switch Q2 are turned off, the control circuit 130 detects the detected voltage value between the first switch Q1 and the second switch Q2. In one embodiment, the control circuit 130 periodically repeat step S302 to record multiple detected voltage values.

In step S303, the control circuit 130 determines the current information (e.g., strength of current, direction of current) of the driving current according to the detected voltage value. In one embodiment, the control circuit 130 detects the driving current output by the driving circuit 110 when the first switch Q1 and the second switch Q2 are turned off, and record as a current curve (e.g., the driving current Ip shown in FIG. 2A).

In step S304, the control circuit 130 continues to determine whether the driving current is less than the predetermined value, such as whether it is zero. If the driving current is not less than the predetermined value, continue to step S303. In some embodiments, the driving current will pass through the zero point during the detection period.

In step S305, when the driving current is less than the predetermined value, the control circuit 130 controls/adjusts the control signals UH, UL, WH, WL, VH, VL, so as to maintain the first switch and the second switch into the turn off state during the fixed detection period.

In step S306, during the detection period, the control circuit 130 detects the back electromotive force of the motor device 120 to obtain multiple detection electromotive force and to calculate the zero crossing time of the back electromotive force. In one embodiment, the control circuit 130 takes the characteristic line formed by multiple the detection electromotive force as the changing trend of the back electromotive force, and calculates the zero point according to the slope of the characteristic line.

In step S307, the control circuit 130 determines the rotor position of the motor device 120 according to the calculated zero crossing time. Then, the control circuit 130 adjusts the rotating speed signal or the control signal according to the rotor position. The switching frequency of the control signals UH, UL, WH, WL, VH, VL will be changed accordingly, so that the current phase and the voltage phase of the motor device 120 will be close to each other to improve operational efficiency. In other words, the current phase and the voltage phase of the motor device 120 will be changed according to the switching frequency.

In one embodiment, the motor system 100 performs the above motor driving method in each period, so that the motor system 100 can have better performance. The number of detecting the back electromotive force can be adjusted, but the time length of the detection period Td is a fixed value. The present disclosure calculates the zero crossing time according to the characteristic line of the detection electromotive force, so the control circuit 130 does not need to use a senor to obtain the time point when the back electromotive force returns to zero. Accordingly, the problem of abnormal operation due to the long time that the first switch Q1 and the second switch Q2 are turned off will be avoided.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A motor driving method, comprising:
    detecting a detected voltage value between a first switch and a second switch in a driving circuit, wherein the driving circuit is electrically connected to a power supply and a motor device, and is configured to control the first switch and the second switch according to a switching frequency to provide a driving current to the motor device;
    determining the driving current according to the detected voltage value;
    turning off the first switch and the second switch for a detection period when the driving current is less than a predetermined value, wherein a length of the detection period is fixed;
    during the detection period, detecting a back electromotive force of the motor device to obtain a plurality of detection electromotive force;
    obtaining a characteristic line according to the plurality of detection electromotive force;
    calculating a zero crossing time of the back electromotive force according to a slope of the characteristic line, wherein the driving current passes through a zero point during the detection period; and
    adjusting the switching frequency according to the zero crossing time.

2. The motor driving method of claim 1, wherein the driving circuit comprises a plurality of bridge arm circuits, the first switch and the second switch are arranged in a same one of the plurality of bridge arm circuits.

3. The motor driving method of claim 2, wherein the first switch and the second switch are turned off when detecting the detected voltage value between the first switch and the second switch.

4. The motor driving method of claim 1, wherein the switching frequency is a frequency of a pulse width modulation signal, and a time length of the detection period is an integer multiple of a period of the pulse width modulation signal.

5. The motor driving method of claim 4, wherein the integer multiple is a fixed value.

6. The motor driving method of claim 1, wherein a current phase and a voltage phase of the motor device are changed according to the switching frequency.

7. The motor driving method of claim 1, wherein the motor device is a three-phase motor, the three-phase motor comprises three input terminals, and a detection terminal between the first switch and the second switch is connected to one of the three input terminals.

8. A motor system, comprising:
a driving circuit electrically connected to a power supply, and at least comprising a first switch and a second switch, wherein the driving circuit is configured to generate a driving current;
a motor device electrically connected to the driving circuit, and configured to receive the driving current; and
a control circuit electrically connected to the driving circuit, and configured to detect a detected voltage value between the first switch and the second switch, wherein the control circuit is configured to turn off the first switch and the second switch for a detection period when the control circuit determines that the driving current is less than a predetermined value, and the control circuit is configured to detect a back electromotive force of the motor device to calculate a zero crossing time of the back electromotive force;
wherein the driving circuit comprises a plurality of bridge arm circuits, the first switch and the second switch are arranged in a same one of the plurality of bridge arm circuits, and the control circuit is configured to control the first switch and the second switch according to a switching frequency;
wherein the control circuit is configured to adjust the switching frequency according to the zero crossing time; and
wherein a current phase and a voltage phase of the motor device are changed according to the switching frequency.

9. The motor system of claim 8, wherein the control circuit detects the back electromotive force in the detection period, the control circuit is configured to obtain a plurality of detection electromotive force, and is configured to calculate the zero crossing time of the back electromotive force according to the plurality of detection electromotive force.

10. The motor system of claim 9, wherein the driving current passes through a zero point during the detection period.

11. The motor system of claim 10, wherein the control circuit is configured to obtain a characteristic line according to the plurality of detection electromotive force, and is configured to obtain calculate the zero crossing time of the back electromotive force according to a slope of the characteristic line.

12. The motor system of claim 8, wherein the first switch and the second switch are turned off when detecting the detected voltage value between the first switch and the second switch.

13. The motor system of claim 8, wherein the switching frequency is a frequency of a pulse width modulation signal, and a time length of the detection period is an integer multiple of a period of the pulse width modulation signal.

14. The motor system of claim 13, wherein the integer multiple is a fixed value.

* * * * *